March 27, 1928.
M. W. McCONKEY
BRAKE OPERATING MECHANISM
Filed Dec. 31, 1925
1,664,180
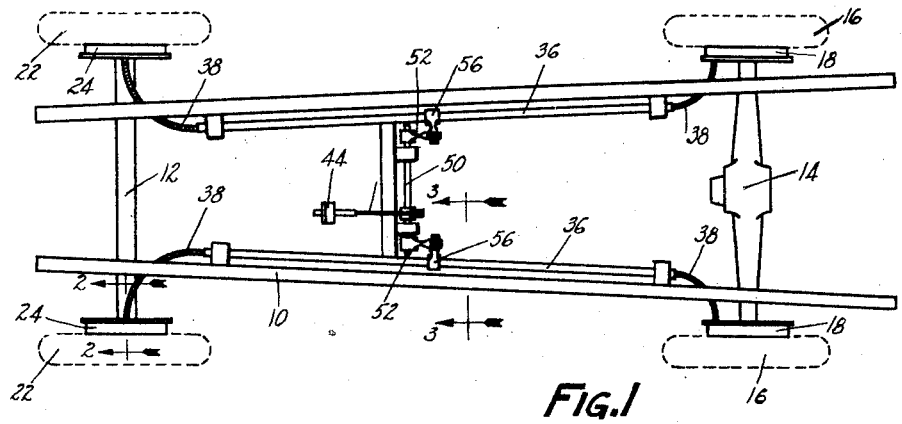
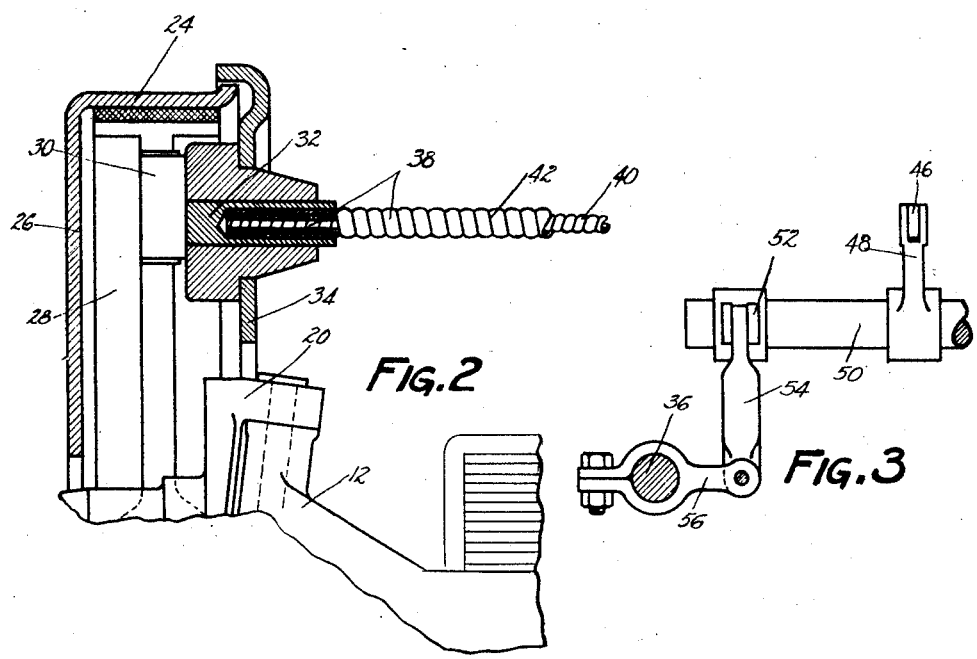
INVENTOR
Montgomery W. McConkey Patented Mar. 27, 1928.

1,664,180

UNITED STATES PATENT OFFICE.

MONTGOMERY W. McCONKEY, OF CHICAGO, ILLINOIS, ASSIGNOR TO BENDIX BRAKE COMPANY, OF CHICAGO, ILLINOIS, A CORPORATION OF ILLINOIS.

BRAKE-OPERATING MECHANISM.

Application filed December 31, 1925. Serial No. 78,554.

This invention relates to vehicle brakes, and is illustrated as embodied in an automobile chassis having brakes on all four wheels. An object of the invention is to provide operating connections which can be rigidly mounted, to eliminate vibration and rattle, by using as part of the operating mechanism one or more rockshafts extending longitudinally of the vehicle. Such rockshafts are readily journalled in supports on the chassis frame, and as no great accuracy is required except at the bearings they are relatively inexpensive.

Preferably advantage is taken of this arrangement to operate the brakes from the ends of the shaft by flexible sections, or other connections, constructed and arranged to permit the chassis frame to move on its springs relatively to the brakes without affecting the application of the brakes. In the arrangement illustrated, these connections are in the form of helically-wound shaft sections turning through approximately 90°, and each connected to and arranged to operate one of the brakes.

As one simple means of using these connections for operating a system of four-wheel brakes, the pedal or other controlling lever may rock a third rockshaft extending crosswise and operatively connected at its ends to the two longitudinal rockshafts.

The above and other objects and features of the invention, including various novel combinations of parts and desirable particular constructions, will be apparent from the following description of one illustrative embodiment shown in the accompanying drawings, in which:

Fig. 1 is a diagrammatic top plan view of an automobile chassis embodying the invention;

Fig. 2 is a partial vertical section on the line 2—2 of Fig. 1, showing the connection at one of the brakes; and Fig. 3 is a partial vertical section on the line 3—3 of Fig. 1, showing one of the connections between the crosswise rockshaft and one of the longitudinal rockshafts.

The chassis illustrated includes a chassis frame 10 supported by the usual springs (not shown) on a front axle 12 and a rear axle 14. The rear axle 14 is supported on wheels 16 having brakes 18, and the front axle 12 has swivelled knuckles 20 at its ends supporting it on wheels 22 having brakes 24. In this particular arrangement, each brake includes a drum 26 (Fig. 2), within which are arranged shoes 28 operated by means such as a double cam 30 on a short shaft 32 supported on the backing plate 34. Except as further described below, the above-identified parts or their equivalents may be of any desired construction.

According to an important feature of the invention, the brakes are applied by a rockshaft or rockshafts 36 extending longitudinally of the vehicle, and journalled in any suitable supports (not shown) carried by the chassis frame 10. At each end of each rockshaft there is a connection such as a flexible shaft section 38 turning through approximately 90°, and secured at its end to one of the camshafts 32. As best appears in Fig. 2, these sections may consist of an inner helically wound part 40 enveloped in an outer part 42 helically wound in the opposite direction. Such connections not only eliminate the necessity for the usual plurality of direction-changing devices, but also serve to permit frame 10 to move with respect to the brakes, as the springs flex, without affecting the application of the brakes.

As a convenient means of rocking shafts 36 to apply the brakes, a pedal 44, or other driver-operated controlling lever or member, may be connected as by a link 46 to an arm 48 on a third rockshaft 50 extending crosswise of the vehicle, and suitably supported by frame 10. At each end, shaft 50 has an arm 52 connected as by a link 54 to an arm 56 on one of the shafts 36.

Regarding the invention from one point of view, each shaft 36 may be regarded as a central section operating the two end sections 38, the whole constituting a novel brake-operating shaft device operating one front brake and one rear brake.

While one illustrative embodiment has been described in detail, it is not my intention to limit the scope of the invention to that particular embodiment, or to use in a system including exactly four brakes, or otherwise than by the terms of the appended claims.

I claim:

1. A vehicle having, in combination, front and rear brakes, a spring-supported chassis frame, a shaft extending longitudinally of the vehicle and supported by the chassis frame, brake-applying means for rocking the shaft about its axis, and flexible operating members connected to the front and rear ends of the shaft arranged to apply respectively the front and rear brakes.

2. A vehicle having, in combination, front and rear pairs of brakes, a spring-supported chassis frame, two shafts supported by and arranged longitudinally of said frame, flexible connections permitting movement of the frame with respect to the brake and extending from the front ends of the two shafts for operating respectively the two front brakes and from the rear ends of the shafts for operating respectively the two rear brakes, and means for rocking the shafts to apply the brakes.

3. A vehicle having, in combination, front and rear pairs of brakes, a spring-supported chassis frame, two shaft devices, each having a central section supported by and extending longitudinally of the frame and each having two flexible end sections turning approximately 90° and connected to and arranged to operate one front brake and one rear brake, and brake-applying means for rocking the two shaft devices arranged to act on said central sections.

4. A vehicle having, in combination, front and rear pairs of brakes, two shaft devices, each having a central section extending longitudinally of the vehicle and each having two flexible end sections turning approximately 90° and connected to and arranged to operate one front brake and one rear brake, and brake-applying means for rocking the two shaft devices arranged to act on said central sections.

5. A vehicle having, in combination, front and rear pairs of brakes, two shaft devices, each having a central section extending longitudinally of the vehicle and each having two flexible end sections turning approximately 90° and connected to and arranged to operate one front brake and one rear brake, a driver-operated lever, a cross-shaft rocked by said lever, and connections from opposite ends of the cross-shaft to the central sections of the shaft devices for operating said devices to apply the four brakes.

6. A vehicle having, in combination, front and rear pairs of brakes, two shaft devices, each having a central section extending longitudinally of the vehicle and each having two flexible end sections turning approximately 90° and connected to and arranged to operate one front brake and one rear brake, a driver-operated controlling device, a cross-shaft rocked by the operation of said device, and connections from opposite ends of the cross-shaft to the central sections of the shaft devices for operating said devices to apply the four brakes.

7. A vehicle having, in combination, front and rear brakes, and a brake-operating oscillatable shaft device having a central section extending longitudinally of the vehicle and having flexible end sections each turning through approximately 90° and connected to and arranged to operate one of the brakes.

8. A vehicle having, in combination, retarding means at one end of the vehicle, a chassis frame, a rigid rockshaft arranged longitudinally of the vehicle and supported entirely by the chassis frame, and a flexible shaft connection from the end of the rockshaft and not alined with the rockshaft for operating the retarding means.

9. A vehicle having, in combination, a chassis frame, a pair of brakes adjacent the end of the frame, a corresponding pair of rigid rockshafts arranged longitudinally of the chassis frame and supported entirely thereby, flexible connections from the ends of the rockshafts for operating the respective brakes, and means for rocking the rockshafts.

In testimony whereof, I have hereunto signed my name.

MONTGOMERY W. McCONKEY.